US009846234B2

(12) United States Patent
Mezger et al.

(10) Patent No.: US 9,846,234 B2
(45) Date of Patent: Dec. 19, 2017

(54) METHOD OF CONFIGURING A LASER SCANNER AND CONFIGURATION OBJECT THEREFORE

(71) Applicant: SICK AG, Waldkirch (DE)

(72) Inventors: Matthias Mezger, Waldkirch (DE); Thomas Schopp, Waldkirch (DE); Stefan Ruck, Waldkirch (DE); Christian Hulm, Waldkirch (DE)

(73) Assignee: SICK AG, Waldkirch (DE)

( * ) Notice: Subject to any disclaimer, the term of this patent is extended or adjusted under 35 U.S.C. 154(b) by 441 days.

(21) Appl. No.: 14/566,789

(22) Filed: Dec. 11, 2014

(65) Prior Publication Data

US 2015/0212202 A1    Jul. 30, 2015

(30) Foreign Application Priority Data

Jan. 24, 2014  (EP) .................................. 14152456

(51) Int. Cl.
*G01S 17/42* (2006.01)
*G01S 17/88* (2006.01)
(Continued)

(52) U.S. Cl.
CPC ............ *G01S 17/42* (2013.01); *G01S 7/4817* (2013.01); *G01S 7/497* (2013.01); *G01S 17/88* (2013.01)

(58) Field of Classification Search
CPC ......... G01B 11/00; G06F 3/005; G06F 3/012; G06F 3/017; G06F 3/0325; G06F 3/011;
(Continued)

(56) References Cited

U.S. PATENT DOCUMENTS 8,018,579 B1 * 9/2011 Krah ...................... G01B 11/00
356/4.01
2011/0267262 A1 11/2011 Gollier
(Continued)

FOREIGN PATENT DOCUMENTS

DE      43 40 756 A1    6/1994
EP      2518709 A1     10/2012
(Continued)

OTHER PUBLICATIONS

European Search Report dated Jul. 4, 2014 in corresponding European Patent Application No. 14152456.1.

*Primary Examiner* — Luke D Ratcliffe
(74) *Attorney, Agent, or Firm* — Nath, Goldberg & Meyer; Jerald L. Meyer; Annie J. Kock

(57) ABSTRACT

The invention relates to a method of configuring a laser scanner, as well as to a configuration object for the method. In order to improve such a method in such a way that it is possible to configure the monitored zone very simply, fast and intuitively, as well as to make available a configuration object for this purpose it is suggested that the method comprises the following steps:
provision of a configuration object;
initiation of a teaching mode of the laser scanner;
detection of the undisturbed viewing field of the laser scanner by the laser scanner;
introduction of the configuration object into the viewing field;
dwelling of the configuration object at a position that should be an edge point of a monitored zone to be configured;
detection of the dwelling by the laser scanner and storage of the positional coordinates;
repetition of the steps d) to f) up until all edge points have been detected; determination of the monitored zone by means of the detected edge points; and
termination of the teaching mode.

14 Claims, 4 Drawing Sheets

Figure 1:
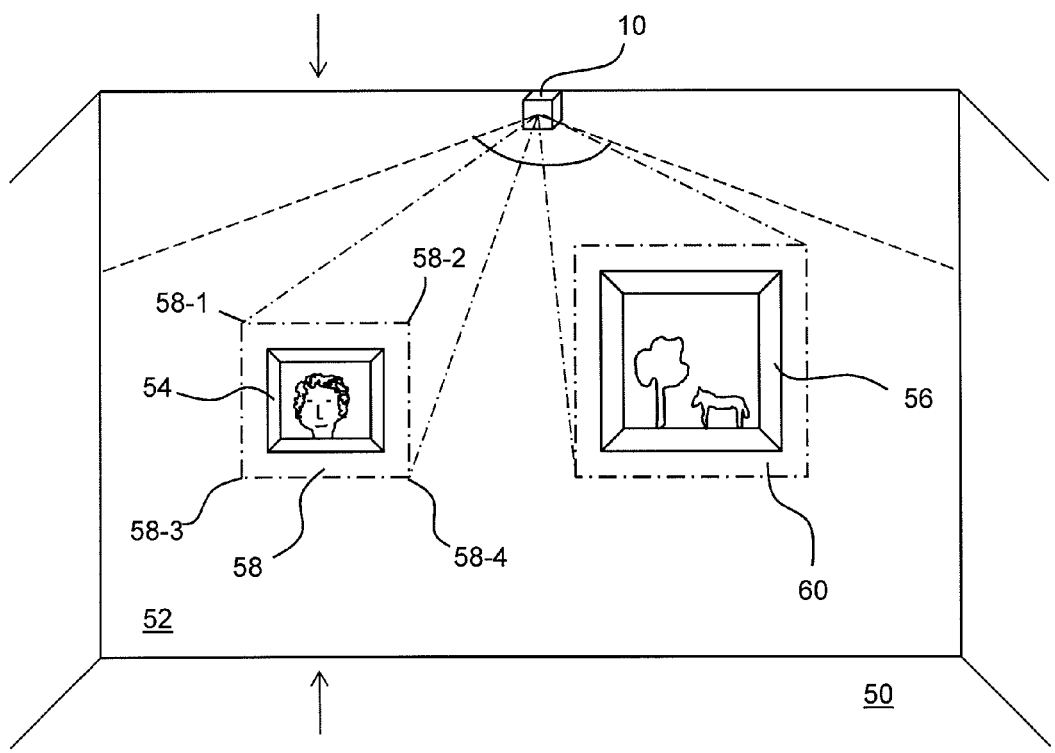

(51) Int. Cl.
*G01S 7/481* (2006.01)
*G01S 7/497* (2006.01)

(58) Field of Classification Search
CPC .... G06F 3/02; G06F 3/04815; G06F 3/04886; G01C 3/085; G01C 3/12; G01S 17/36; G01S 17/48; G01S 7/4817; G01S 7/4861; G01S 7/4865; G01S 17/66
See application file for complete search history.

(56) References Cited

U.S. PATENT DOCUMENTS

| | | | |
|---|---|---|---|
| 2012/0051588 A1* | 3/2012 | McEldowney | G03B 17/54 382/103 |
| 2012/0062867 A1 | 3/2012 | Shibatani | |
| 2012/0249997 A1 | 10/2012 | Matsumoto et al. | |

FOREIGN PATENT DOCUMENTS

| | | |
|---|---|---|
| JP | 07-077424 A | 3/1995 |
| JP | 2002-215238 A | 7/2002 |
| JP | 2010-216946 A | 9/2010 |
| JP | 2012-088296 A | 5/2012 |

* cited by examiner

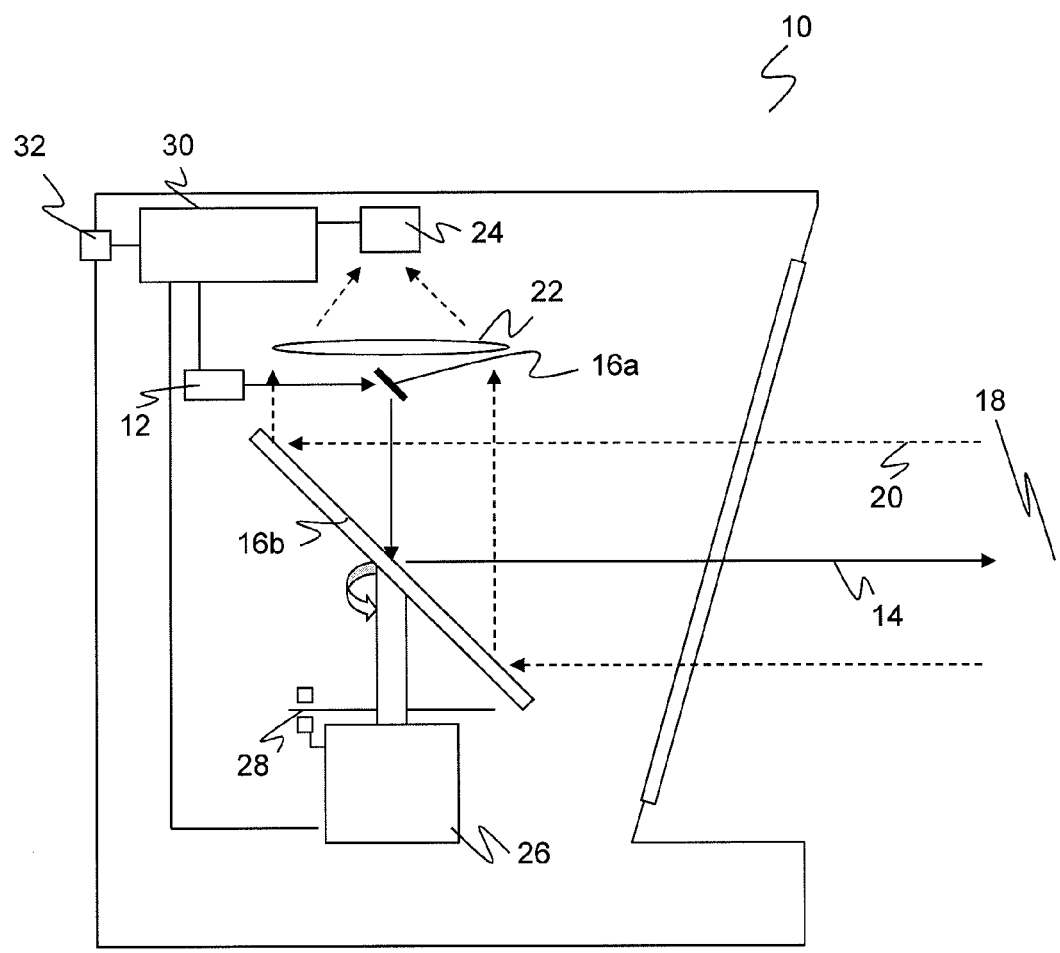
Fig. 6 (State of the art)

METHOD OF CONFIGURING A LASER SCANNER AND CONFIGURATION OBJECT THEREFORE

The invention relates to a method of configuring a laser scanner, as well as to a configuration object for the method.

It is known to secure valuable objects, e.g. works of art in museums, with the aid of a laser scanner. Such a common laser scanner is shown in FIG. 6 in a schematis sectional illustration and is e.g. described in the DE 43 40 756 A1. A light beam 14 that has individual light pulses and that is generated by a light transmitter 12, for example a laser, is deflected via light deflection units 16a-b into a monitored plane 18 and is remitted there from a possibly present object. The remitted light 20 arrives back at the laser scanner 10 via the deflection unit 16b as well as via reception optics 22 and is detected there by a light receiver 24, for example a photodiode.

The light deflection unit 16b is generally configured as a rotating mirror that continuously rotates through the drive of a motor 26. The respective angular position of the light deflection unit 16b is detected via an encoder 28. The light beam 14 generated by the light transmitter 12 thus scans the monitored plane 18 generated by the rotational movement. If a reflected light signal 20 received by the light receiver 24 is received from the monitored plane 18, then the angular position of the object in the monitored plane 18 can be determined from the angular position of the deflection unit 16b by means of the encoder 28.

Additionally, the propogation time of the individual laser light pulses from their transmission up to the reception after reflection at the object in the monitored plane 18 is determined. From the propagation time a determination is made with respect to the distance of the object from the laser scanner 10 on use of the speed of light. This evaluation takes place in an evaluation unit 30 which is connected to the light transmitter 12, the light receiver 24, the motor 26 and the encoder 28 for this purpose. Thus two-dimensional polar coordinates of all objects in the monitored plane 18 are available via the angle and the distance. This information on object positions can be output via an interface 32.

With the aid of such a laser scanner, a kind of virtual curtain is spanned in front of a painting, for example a valuable painting, by means of the monitored plane and an alarm is triggered when someone approaches this too close in a non-allowable manner.

Such that the correct region, namely only the region in which the painting to be secured hangs, is monitored as a monitored zone, the laser scanner and/or the monitored zone has to be configurated prior to its operation. The monitored zone to be monitored in particular has to be determined and/or fixed.

Known solutions for this purpose provide that during the taking into operation of the laser scanner the geometry of the monitored zone is parameterized at a graphical user interface with the aid of a computer and specific software and is transmitted to the laser scanner via a communication interface. This process can only be carried out by a trained user having corresponding computer and software knowledge and requires a computer. Typically museum staff that should carry out such configurations e.g. in order to adapt the securing of changing exhibitions and exhibits, is not trained in how to operate laser scanners and computers.

Other known solutions provide that the monitored zone is directly input at the laser scanner with the aid of keys and a display. Such a method is only possible for a very simple geometry of the monitored zone due to the configuration demanding in effort and cost and requires specifically trained staff. Furthermore, it is demanding in effort and cost, in particular when the laser scanner is assembled at inaccessible positions, e.g. at the ceiling of an exhibition space.

From the U.S. Pat. No. 8,018,579 B1 an apparatus for the recognition of gestures is known, in which a 3D scanner detects a space in which gestures are made with the hands. Additionally, virtual operating elements are projected into the space such that one can operate the virtual operating elements with the gestures via the scanner that detects the gestures.

From the US 2011/0267262 A1 an apparatus is known in which a light beam is moved (scanned) over a diffusely scattering screen and it is detected whether and where the screen is, for example, touched by a finger by means of a light receiver that detects the diffusely reflecting light.

It is an object of the present invention to make available a method of configuring a monitored zone of a laser scanner by means of which it is possible to configure the monitored zone, very simply, quickly and intuitively, as well as to make available a configuration object for this purpose.

This object is satisfied by a method of configuring a laser scanner comprising the steps:

provision of a configuration object;
initiation of a teaching mode of the laser scanner;
detection of the undisturbed viewing field of a laser scanner by the laser scanner and storage of static objects as background in the viewing field;
introduction of the configuration object into the viewing field;
dwelling of the configuration object at a position that should be an edge point of a monitored zone to be configured;
detection of the dwelling by the laser scanner and storage of the positional coordinates of the edge points;
repetition of the steps d) to f) up until all edge points are detected;
determination of the monitored zone by means of the detected edge points; and
termination of the teaching mode.

The essential advantage of the method in accordance with the invention is that the configuration of the monitored zone is simplified to a maximum. In the simplest embodiment the configuration object can be a finger or an arm, such that in principle additional auxiliary means are not even required. The laser scanner does not have to know the configuration object. The staff that carries out the configuration must merely start the teaching mode and then only has to "indicate" the edge points of the monitored zone, for example with the finger. The actual configuration is then carried out completely self-contained by the laser scanner, namely the "finger indication" is defined as edge points and therefrom the monitored zone is determined.

No computer and no software and thus no prior knowledge is required such that also untrained museum staff can carry out such a configuration without errors with technical devices by means of the simple configuration of the monitored zone and in this way changing exhibitions and exhibits can be secured quickly and simply.

In an embodiment of the invention the teaching mode is initiated by means of a switching signal, which is preferably triggered by a key switch, via a switching signal input of the laser scanner. In this way it is ensured that the teaching mode is not accidently initiated.

It is useful when static objects in the viewing field of the laser scanner are taught as background on the detection of the viewing field of the laser scanner, such that a change of the background could possibly likewise initiate a corresponding signal.

In order to make the edge points of the monitored zone recognizable for the laser scanner during the configuration it is useful when the dwelling of the configuration object in the viewing field may amount to a few seconds, preferably 3 to 5 seconds, whereby an edge point can be recognized as such for the laser scanner.

Such that the person who configures the laser scanner can also be sure that an edge point was detected it is advantageous when, following the detection and/or the storage of the position that should be an edge point of the monitored zone to be configured, the laser scanner outputs a signal, with this signal being an optical signal and/or an acoustic signal and the signal being able to be output via an interface.

Shapes of monitored zones can exist which are not allowed due to the functional principle of the laser scanner such that in an embodiment of the invention an edge point is checked with regard to its validity and is discarded as invalid when it satisfies an invalidity criterion.

As an edge point theoretically is only a point and the configuration object has a certain extent in the scanning plane (for example, the finger thickness) it is provided in an embodiment of the invention that the central point of the configuration object is defined as an edge point within the scanning plane.

Having regard to most cases of application it is sufficient when the boundary of the monitored zone forms a frequency polygon, wherein the edge points are connected by straight lines. Such a frequency polygon can be calculated simply and quickly.

In order to also be able to carry out corrections during the configuration it is provided that a deletion of a configured monitored zone can be initiated by means of the configuration object.

The above mentioned object is also satisfied by a configuration object for the carrying out of the method in accordance with the invention that is characterized in that the configuration object is configured as a rod and in that the rod has a communication interface in order to communicate with the laser scanner.

Via this communication interface information from the laser scanner can be transmitted to the installer by means of a signal encoder unit, for example the detection and storage of a valid edge point, such that the installer knows that the respective edge point was correctly determined.

The communication can include further information with respect to the discarding of an edge point and the deletion of a monitored zone.

It is particularly advantageous when the signal encoder unit is configured to output a vibration signal. It is then particularly simple for the installer to recognize when the laser scanner has detected the edge points in each spatial position.

Figure 2:
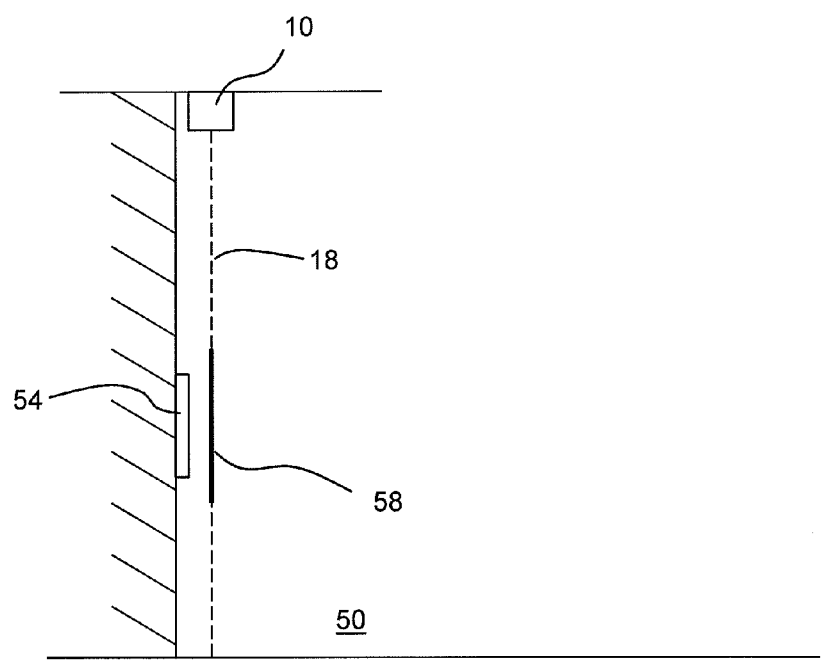
Figure 3:
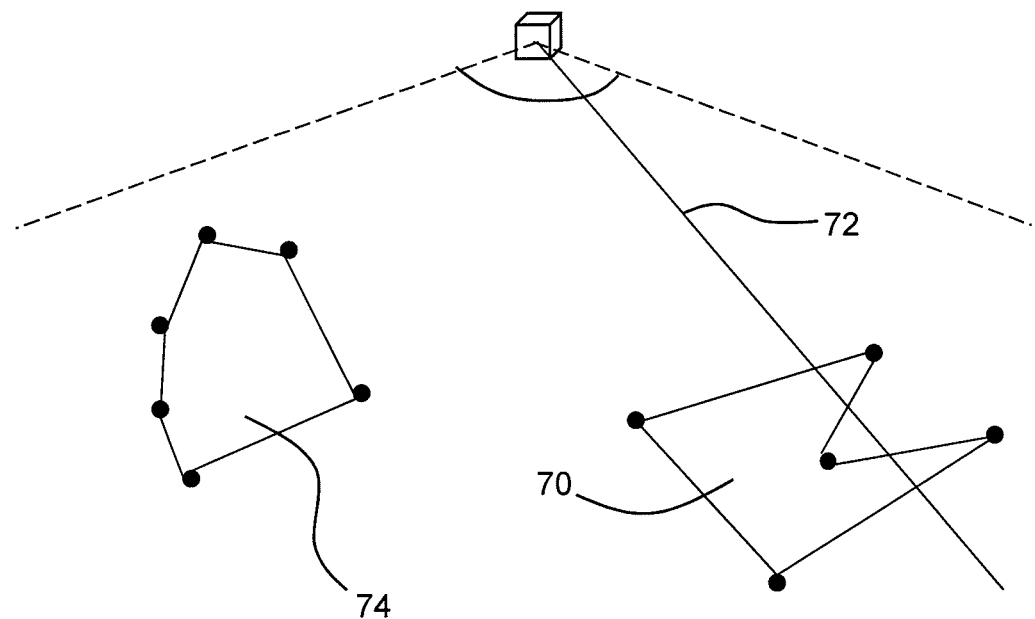
Figure 4:
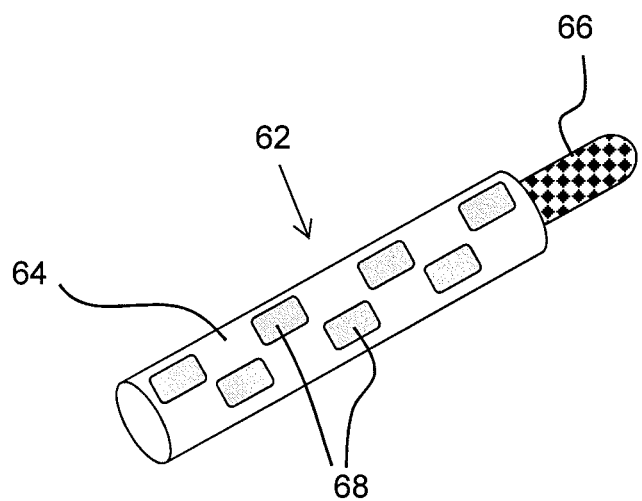
Figure 5:
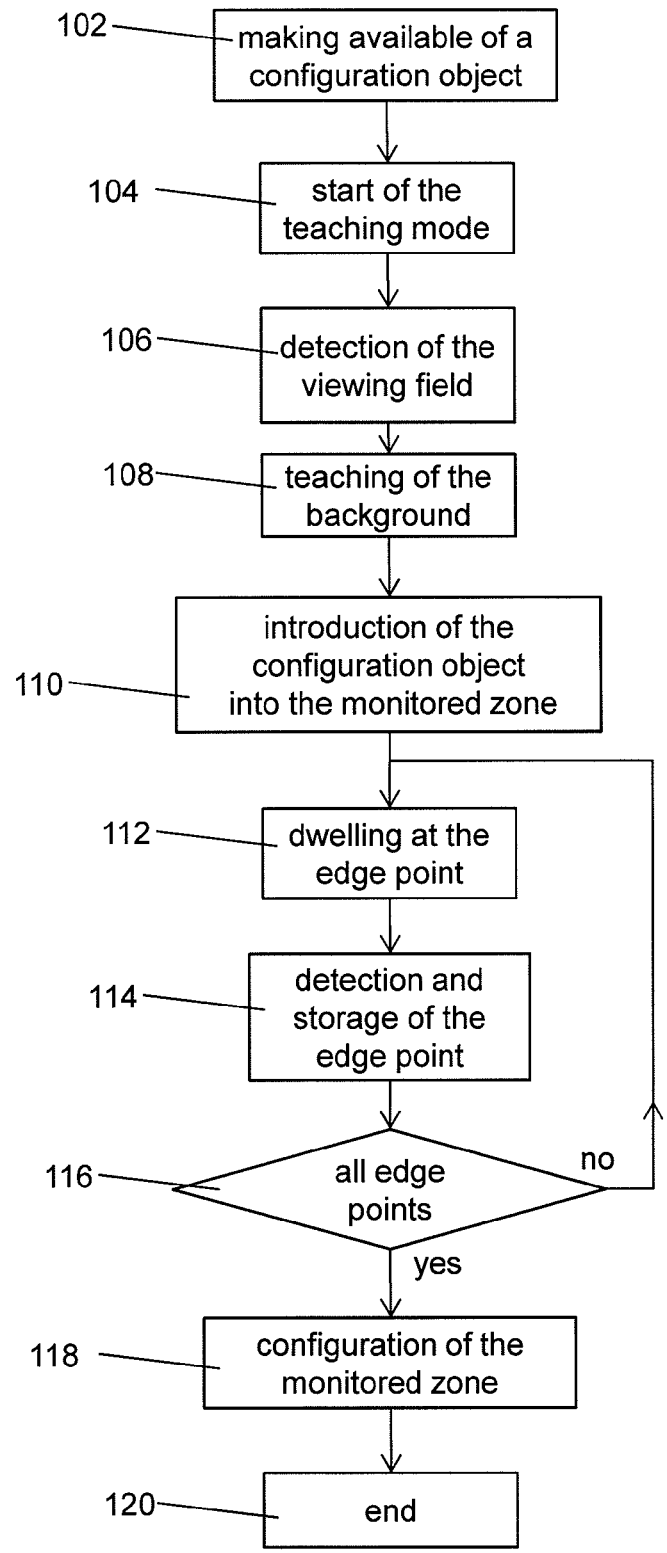

In the following the invention will be described in detail by means of embodiments with reference to the drawing. In the drawing there is shown:

FIG. 1 a case of application for the method in accordance with the invention;

FIG. 2 the case of application of FIG. 1 in a different perspective;

FIG. 3 different forms of valid and invalid monitored zone shapes;

FIG. 4 an embodiment of a configuration object;

FIG. 5 a process diagram of the method in accordance with the invention; and

FIG. 6 a laser scanner in accordance with the state of the art.

FIGS. 1 and 2 show a typical case of application of the invention. In an exhibition space 50 paintings 54 and 56 are exhibited at a wall 52 that should be secured against an unallowed access. A laser scanner 10 arranged at a region of the wall 52 at the ceiling serves for this purpose, the laser scanner having been described in the introduction. The monitored plane 18 forms a virtual curtain in front of the paintings 54 and 56. As the complete wall 52 however does not have to be secured, but only the monitored zones 58 and 60, behind which the paintings hang, the monitored zones, this means the shape, sizes and positions of the monitored zones 58 and 60 have to be taught to the laser scanner 10. This configuration of the monitored zones 58 and 60 takes place by means of the method in accordance with the invention and a configuration object 62 in accordance with the invention.

The method in accordance with the invention shall be explained in particular with reference to FIG. 5. In a first step 102 a configuration object is made available. In the simplest case of application this can be a finger or a different body part (e.g. an arm) or preferably the configuration object 62 in accordance with the invention. This configuration object 62, that is schematically illustrated in FIG. 4, is configured as a rod 64 having a handle 66. The rod 64 at an upper side includes light reception elements 68 that can receive the laser light of the laser scanner. Furthermore, the configuration object 62 comprises a signal encoder unit that is integrated into the handle 66 and that can output a signal by vibration of the handle 66.

In a step 104 the teaching mode of the laser scanner is initially initiated. This can be brought about by a key switch or the like.

In the subsequent step 106 the laser scanner initially detects the free undistorted viewing field and in the step 108 stores static objects as background in the viewing field.

Then the actual definition of the boundary of the monitored zone takes place. For this purpose the configuration object 62 is introduced into the viewing field of the laser scanner in the step 110 and in the step 112 is introduced and maintained at an edge point of the monitored zone 58 to be defined. Through the dwelling of the configuration object 62 at this point the laser scanner 10 recognizes that this should be an edge point of the configuration object 58 (e.g. 58-1 up to 58-4).

In step 114 the laser scanner 10 detects this point as an edge point and stores its positional coordinates. The information of the edge point that the laser scanner has detected and stored is preferably transmitted to the configuration object 62. This can, for example, take place thereby that the laser scanner does not transmit a certain number n of its light pulses for a short period of time, this is detected by the light reception elements 68 of the configuration object 62 and is thus interpreted as an actuation signal. This information can then be transmitted via the signal encoder unit to the installer, for example by a single vibration of the handle 66. In a like manner, information can also be transmitted, for example, according to which the laser scanner 10 has not stored this edge point for whatever reasons. One such information could be provided in an analogue manner thereby that m (unequal to n) light pulses are transmitted and that this information is transmitted to the installer via a pulsed vibration of the handle 66. Alternatively arbitrary information can also be directly indicated at the laser scanner, e.g. via LEDs such that these can be optically read by the installer.

These steps 112 and 114 for the detection and definition of the edge points are repeated for so long (step 116) up until all edge points 58-1 up to 58-4 are stored in the laser scanner 10.

Finally in step 118, after input of all edge points 58-1 up to 58-4, the monitored zone 58 is determined and is configured in this way. For most cases of application it is sufficient when the boundary of the monitored zone forms a frequency polygon, wherein the edge points are connected by straight lines. Such a frequency polygon can be calculated simply and quickly.

At the end the laser scanner then has to be placed back into the normal mode of operation in a step 120.

Shapes of monitored zone can exist that are not allowed due to the functional principle of the laser scanner 10 such that, as mentioned above, an edge point has to be checked with respect to its validity and is discarded as invalid when it satisfies an invalidity criterion. For example, laser scanners working according to the principle of the state of the art (FIG. 6), frequently operate in such a manner that a currently measured distance value of an object is merely compared to stored minimum values and maximum values that correspond to boundaries of the monitored zone at a corresponding angle. In most cases of application this is sufficient, as the laser scanner 10 must merely determine whether or not an object (regardless of where) is present in the monitored zone. The monitored zone 70 that is illustrated in FIG. 3 however has a shape that does not permit this evaluation with respect to a certain angle as can be recognized at the exemplary transmission beam 72 that namely cuts the monitored zone 70 twice. Thereby, an unambiguous association with respect to a minimum value and a maximum value is no longer possible as two of these exist at this angle. FIG. 3 for the purpose of emphasis additionally shows a further exemplary monitored zone 74 which indeed does not have a non-rectangular shape, but which is generally allowed, when the laser scanner 10 works in the previously mentioned manner.

As an edge point theoretically only is a point and the configuration object 62 has a certain extent in the scanning plane, namely the diameter of the rod 64, it is provided that the laser scanner 10 calculates the central point of the rod 64 and defines this central point as an edge point.

In order to also be able to carry out corrections during the configuration it is provided that a deletion of a configured monitored zone can be initiated by means of the configuration object 62. This takes place in that the configuration object 62 remains static for a long period of time in a position stable manner at a position within the monitored zone to be deleted, for example for 10 s. That the deletion of the complete monitored zone takes place in the laser scanner 10 can be transmitted back to the configuration object 62 in a manner analog to the successful storage of the edge points and can be output to the installer via the signal encoder unit.

The invention claimed is:

1. A method of configuring a laser scanner, comprising the steps:
 a) provision of a configuration object;
 b) initiation of a teaching mode of the laser scanner;
 c) detection of an undisturbed viewing field of the laser scanner by the laser scanner and storage of static objects as background in the undisturbed viewing field;
 d) introduction of the configuration object into the undisturbed viewing field;
 e) dwelling of the configuration object at a position which should be an edge point of a monitored zone to be configured;
 f) detection of the dwelling by the laser scanner and storage of the positional coordinates of the edge points;
 g) repetition of the steps d) to f) up until all edge points have been detected;
 h) determination of the monitored zone by means of the detected edge points; and
 i) termination of the teaching mode.

2. The method in accordance with claim 1, wherein the teaching mode is initiated by means of a switching signal via a switching signal input of the laser scanner.

3. The method in accordance with claim 2, wherein the teaching mode is triggered by a key switch.

4. The method in accordance with claim 1, wherein the dwelling amounts to a few seconds.

5. The method in accordance with claim 4, wherein the dwelling amounts to 3 to 5 seconds.

6. The method in accordance with claim 1, wherein the laser scanner outputs a signal following the detection of and/or storage of the location that should be an edge point of the monitored zone to be configured.

7. The method in accordance with claim 6, wherein the signal is an optical signal and/or an acoustic signal and/or can be output via an interface.

8. The method in accordance with claim 1, wherein an edge point is checked with regard to validity and is discarded as invalid when it satisfies an invalidity criterion.

9. The method in accordance with claim 1, wherein a central point of the configuration object within the scanning plane is defined as the edge point.

10. The method in accordance with claim 1, wherein a boundary of the monitored zone forms a frequency polygon, wherein the edge point is connected by straight lines.

11. The method in accordance with claim 1, wherein deletion of a configured monitored zone can be initiated by means of the configuration object.

12. A configuration object for carrying out a method comprising the steps:
 a) provision of a configuration object;
 b) initiation of a teaching mode of the laser scanner;
 c) detection of an undisturbed viewing field of the laser scanner by the laser scanner and storage of static objects as background in the undisturbed viewing field;
 d) introduction of the configuration object into the undisturbed viewing field;
 e) dwelling of the configuration object at a position which should be an edge point of a monitored zone to be configured;
 f) detection of the dwelling by the laser scanner and storage of the positional coordinates of the edge points;
 g) repetition of the steps d) to f) up until all edge points have been detected;
 h) determination of the monitored zone by means of the detected edge points; and
 i) termination of the teaching mode,
 wherein the configuration object is configured as a rod, and wherein the rod has a communication interface in order to communicate with the laser scanner.

13. The configuration object in accordance with claim 12, wherein a signal encoder unit is provided in order to indicate a detection and storage of an edge point and/or to indicate discarding an edge point and/or deletion of a monitored zone.

14. The configuration object in accordance with claim 13, wherein the signal encoder unit is configured to output a vibration signal.

* * * * *